United States Patent [19]

Brew

[11] 4,355,994
[45] Oct. 26, 1982

[54] COVERED V-BELT HAVING REDUCED COEFFICIENT OF FRICTION SIDES AND METHOD OF MAKING THE SAME

[75] Inventor: James K. Brew, Springfield, Mo.

[73] Assignee: Dayco Corporation, Dayton, Ohio

[21] Appl. No.: 147,431

[22] Filed: May 6, 1980

[51] Int. Cl.³ .............................................. F16G 5/16
[52] U.S. Cl. ................................... 474/270; 474/266
[58] Field of Search ............. 474/271, 270, 268, 272, 474/260, 264, 266

[56] References Cited

U.S. PATENT DOCUMENTS

| | | | |
|---|---|---|---|
| 2,429,994 | 11/1947 | Crosby | 474/270 X |
| 2,655,195 | 10/1953 | Curtis | 198/847 |
| 2,897,098 | 7/1959 | Homer et al. | 474/270 X |
| 3,608,702 | 9/1971 | Fraioli, Sr. | 198/847 |
| 3,661,823 | 5/1972 | Fix et al. | 474/263 X |
| 3,863,516 | 2/1975 | Fisher et al. | 474/271 |
| 4,024,773 | 5/1977 | Hartman et al. | 474/263 |
| 4,031,768 | 6/1977 | Henderson et al. | 474/250 |
| 4,169,021 | 9/1979 | Argentiero | 474/270 X |
| 4,244,234 | 1/1981 | Standley | 474/263 |

*Primary Examiner*—Rodney H. Bonck
*Attorney, Agent, or Firm*—Joseph V. Tassone

[57] ABSTRACT

A covered V-belt having reduced coefficient of friction sides and a method for making the same are provided. The outer cover of the belt of this invention comprises a metallic material incorporated with the elastomeric material of the cover, which material is so incorporated either by depositing a thin film of the material onto a finished belt or by mixing a finely divided metallic material into the elastomer.

4 Claims, 6 Drawing Figures

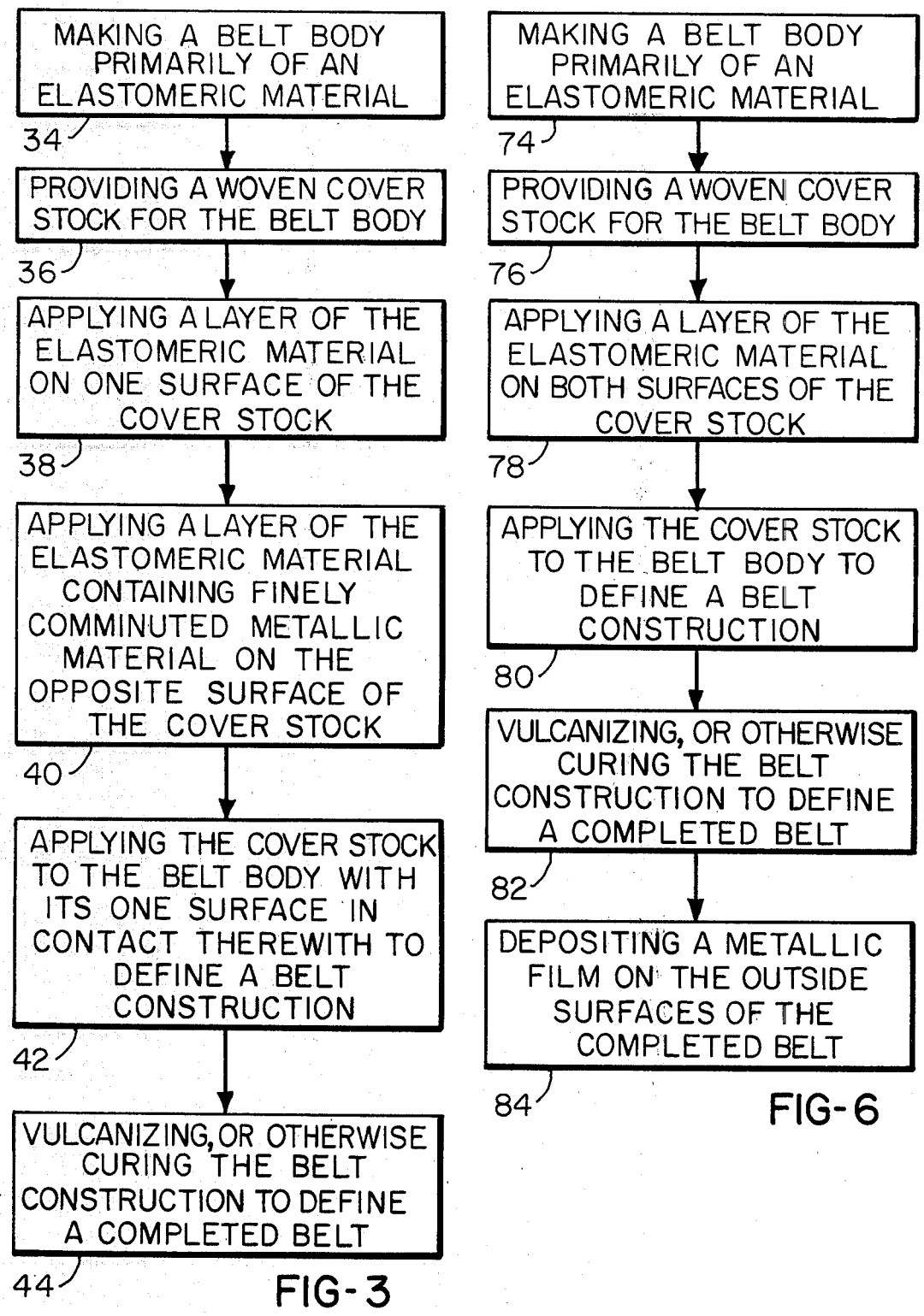

COVERED V-BELT HAVING REDUCED COEFFICIENT OF FRICTION SIDES AND METHOD OF MAKING THE SAME

BACKGROUND OF THE INVENTION

This invention relates to endless power transmission belts.

Endless power transmission belts having a cross-section in the form of a trapezoid, and commonly known as V-belts, are well known and widely used. V-belts transmit power by wedgingly engaging the complimentarily shaped groove of a V-pulley. The forced contact between the sides of the pulley groove resists slippage of the belt in the pulley. It is desirable, however, for the belt to enter and leave the pulley with as little resistance as possible. It has been found that a high coefficient of friction between the belt and the pulley results in a comparatively high belt operating tension, while a reduced belt to pulley coefficient of friction results in a reduced belt operating tension.

V-belts are normally characterized by such basic elements as a load-carrying section, generally composed of strength cords embedded in an elastomer, an upper tension section and a lower compression section. An example of a belt of this type is described and illustrated (FIG. 1) in U.S. Pat. No. 3,863,516. The belt may be covered by a fabric envelope or cover having an elastomer on one or both surfaces thereof, as described and illustrated (FIG. 2) in U.S. Pat. No. 3,863,516. The fabric covered belt is known in the art as a wrapped, molded V-belt. Where a fabric cover is not used, the resulting belt is commonly known as a molded or raw-edge belt, depending upon the particular manufacturing method employed.

The coefficient of friction of raw-edge belts can be reduced by incorporating graphite into the elastomeric material which makes up at least one of the load-carrying, tension and/or compression sections of the belt, as described, for example in U.S. Pat. Nos. 4,024,773 and 4,031,768. In the case of fabric covered V-belts, polyfluorohydrocarbon resins which have polymer lubricating properties may be incorporated into the elastomeric material which is used to impregnate the cover fabric, as described in U.S. Pat. No. 3,661,823.

It is an object of the present invention to provide a novel method for reducing the coefficient of friction between a metal pulley and a wrapped, molded V-belt.

It is another object of this invention to provide a novel wrapped, molded V-belt having reduced coefficient of friction pulley-contacting sides.

It is a further object of this invention to provide a method for manufacturing a wrapped, molded V-belt having reduced coefficient of friction sides.

Other objects, aspects and advantages of the present invention will be apparent to those skilled in the art from the following description of the invention.

SUMMARY OF THE INVENTION

In accordance with the present invention there is provided a novel method for reducing the coefficient of friction between a metal pulley and a wrapped, molded V-belt entrained therearound, which comprises incorporating a metallic material into the cover stock of the belt.

There is also provided a novel wrapped, molded V-belt having a metallic material incorporated into the cover stock of the belt.

There is further provided a method for manufacturing a wrapped, molded V-belt having reduced coefficient of friction sides.

BRIEF DESCRIPTION OF THE DRAWING

In the drawing,

FIG. 3 is a block diagram presentation of the method employed to make the belt of FIG. 1;

FIG. 6 is a block diagram presentation of the method employed to make the belt of FIG. 4.

DETAILED DESCRIPTION OF THE DRAWING

Figure 1:
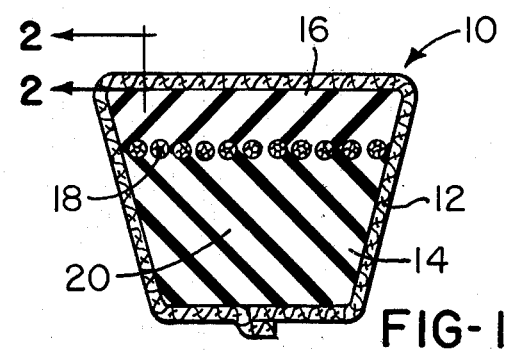
FIG. 1 is a cross-sectional view illustrating one exemplary embodiment of a wrapped, molded V-belt of this invention.

Referring now to FIG. 1 of the drawing, the belt of this invention is designated generally by the reference numeral 10. The belt 10 has a trapezoidal outline when viewed in cross-section and is often referred to as a V-belt.

The belt 10 has a cover 12 which covers its entire peripheral outline. The cover 12 covers a belt body 14 which is made primarily of an elastomeric material and such body includes a tension section 16, a load-carrying section 18 defined in this example by load-carrying means in the form of a helically-wound load-carrying cord 18, and a compression section 20. Any suitable elastomeric material may be employed to define the main portion of the belt body. Such material may be a natural or synthetic rubber or a suitable plastic material.

Figure 2:
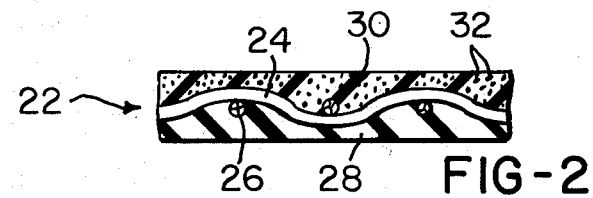
FIG. 2 is an enlarged fragmentary cross-sectional view taken along lines 2—2 of FIG. 1.

The cover 12 is preferably made of a woven fabric 22, see FIG. 2, which may be a natural or synthetic fabric, such as cotton, rayon, nylon, polyester, aramid, or the like, including blends thereof. The fabric 22 has the usual warps 24 and wefts 26 and such fabric is preferably bias cut whereby the warps and wefts extend at an angle to the longitudinal axis of the belt.

The cover 12 has a layer 28 defining one surface thereof and a layer 30 defining the opposite surface. The layers 28 and 30 are made preferably of the same elastomeric material as comprises the major portion of the main body 14 of the belt 10. The layer 30, which defines the outside surface of the belt 10 differs from the layer 28 in that the layer 30 also comprises a metallic material. The metallic material may be in the form of a finely comminuted material 32 homogeneously dispersed through the layer 30, as shown in FIG. 2.

Having described the belt 10, the description will now proceed making reference to FIG. 3 with a presentation of the method employed to make such belt. Referring now to FIG. 3, as shown by block 34, a belt body is made primarily of any suitable elastomeric material and such belt body, when completed, would have the appearance of the belt body 14 illustrated in FIG. 1 within the outer cover 12. Any technique known in the art may be used to make the belt body.

As shown in the block 36, a cover stock is provided, preferably in the form of a woven cover stock. The cover stock 22 is processed by applying the layer 28 of elastomeric material on one surface thereof, as indicated by block 38, the layer 28 being illustrated in FIG. 2. The layer 28 is preferably made of the same elastomeric material used to define the belt body 14 whereby a tenacious bond between the belt body and cover 12 is assured. The elastomeric material containing the finely comminuted metallic material 32 is applied in a layer 30 on the opposite surface of the cover stock 22 as indicated in the block 40.

The cover stock with the layer 28 of elastomeric material defining one surface and the layer 30 of elastomeric material containing the metallic material 32 defining its opposite surface is then suitably applied to the belt body 14 as by a wrapping action, for example, with the surface layer 28 in contact with the belt body 14 to define a belt construction, as indicated by the block 42. Any suitable apparatus or technique may be employed to apply the cover 12 defined by cover stock 22 and layers 28 and 30, to the belt body 14.

The belt construction defined after covering the belt body 14 with the cover 12 is then vulcanized or otherwise cured using techniques and apparatus known in the art, as indicated by block 44, to define a completed belt, illustrated in cross-section in FIG. 1.

Figure 4:
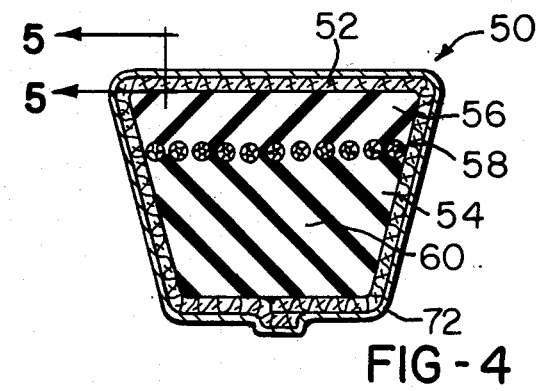
FIG. 4 is a cross-sectional view of another exemplary embodiment of a wrapped, molded V-belt of this invention.
Figure 5:
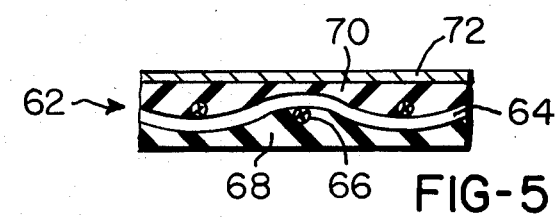
FIG. 5 is an enlarged fragmentary cross-sectional view taken along lines 5—5 of FIG. 4.

Another exemplary embodiment of this invention is illustrated in FIGS. 4–6. FIG. 4 illustrates a belt 50 having a cover 52 which covers a belt body 54 made primarily of elastomeric material. The belt body 54 includes a tension section 56, a load-carrying section defined in this example by a helically-wound load-carrying cord 58, and a compression section 60.

The cover fabric is preferably made of a woven fabric 62, see FIG. 5, which may be a natural or synthetic fabric, such as fabric 22, previously described. The fabric 62 has the usual warps 64 and wefts 66 and comprises a layer 68 defining one surface thereof and a layer 70 defining the opposite surface. The layers 68 and 70 are made preferably of the same elastomeric material as comprises the major portion of the main body 54. The belt 50 has a discrete layer 72 of a metallic material which defines the outside surface of the belt.

Having described the belt 50, the description will now proceed making reference to FIG. 6 with a presentation of the method employed to make the belt 50. As shown by block 74, a belt body is made primarily of any suitable elastomeric material. Such belt body, when completed, would have the appearance of the belt body 54 illustrated in FIG. 4 within the outer cover 52. Any technique known in the art may be used to make the belt body.

As shown by block 76, a cover stock is provided, preferably in the form of a woven cover stock. The cover stock 62 is processed by applying layers 68 and 70 of elastomeric material defining the surfaces thereof, as indicated by block 78.

The cover stock with the layers 68 and 70 of elastomeric material defining the surfaces thereof is then suitably applied to the belt body 54, as indicated by block 80.

The belt construction defined after covering the belt body 54 with the cover 52 is then vulcanized or otherwise cured using techniques and apparatus known in the art, as indicated by block 82.

A metallic film is then deposited on the outside surfaces of the cured belt, as indicated by block 84, using technique and apparatus known in the art.

The metallic material 32 may be any suitable metal, metal oxide, metal sulfide or metal alloy. Virtually any metal or metallic material may be used, although common sense should prevail when selecting the metal or metallic material 32 which is to be incorporated with the elastomeric material 30 which defines the outside surface of the belt. The metal or metallic material 32 should be non-abrasive with regard to the various materials comprising the belt and particularly with regard to the pulley or sheave that the belt will be operated with. The metal or metallic material 32 should be non-reactive under normal environmental conditions; that is the material 32 should not react unfavorably with the elastomer or any of the mixing and processing machinery, or with the atmosphere or environment where the belt is to be used. The metal or metallic material 32 is preferably softer than the materials commonly used to make pulleys or sheaves, so as not to wear out the pulley groove prematurely.

Examples of suitable elemental metals are copper, silver, gold, zinc, cadmium, aluminum, thallium, indium, lead, tin, bismuth, chromium, molybdenum, tungsten, manganese, iron, cobalt and nickel, and mixtures thereof. Examples of suitably alloys are alloys of aluminum with copper, manganese, silicon, iron, magnesium, zinc, tin and lead; alloys of bismuth with lead, tin, cadmium and mercury and the like, and mixtures thereof; alloys of cobalt with chromium and tungsten; alloys of copper with aluminum, iron, tin, gold, silver, lead, manganese, silicon, nickel, zinc, carbon, bismuth, platinum, phosphorous, antimony, cobalt, and the like and mixtures thereof; alloys of iron, nickel and cobalt with sulfur, manganese, carbon, phosphorous, aluminum, silicon, tungsten, chromium, copper, molybdenum and the like and mixtures thereof. Examples of suitable oxides or sulfides include the oxides and sulfides of the above-named elemental metals.

The metal or metallic material 32 is used in finely divided, i.e. comminuted, form. In general the particles 32 range in size from about 37 to about 149 micron (U.S. Standard Sieve Series No. 400 to No. 100). The amount of the particles 32 can range from about 1 to about 40 weight percent of the weight of elastomer.

The metal or metallic material 32 can be mixed into the elastomeric material by using technique and apparatus known in the art; and the resulting mixture can be applied to the cover fabric by any technique and apparatus known in the art, such as by calendering.

The metallic film 72, previously described, can comprise the elemental metals, alloys, oxides and sulfides previously described. The film 72 may be applied to the belt by sputtering or, preferably, by vacuum deposition, in accordance with techniques using apparatus well known in the art.

Reasonable modifications are possible within the scope of this disclosure without departing from the scope and spirit thereof.

I claim:

1. In a wrapped, molded V-belt having outside surfaces and comprising a belt body made primarily of elastomeric material and having a cover which covers the entire peripheral outline of said belt body, said cover comprising an inner layer of elastomeric material, an outer layer of elastomeric material, and a fabric disposed between said layers, said inner layer being secured to said belt body at said entire peripheral outline thereof and said outer layer defining said outside surfaces of said V-belt, the improvement wherein only said outer layer of said cover has a finely comminuted metallic material intimately mixed with said elastomeric material thereof to provide a reduced coefficient of friction for said outside surfaces of said V-belt and said inner layer of said cover is substantially free of said finely comminuted metallic material while being tenaciously bonded to said belt body.

2. The V-belt of claim 1 wherein said metallic material is selected from the group consisting of metals, metal oxides, metal sulfides and alloys of metals.

3. The V-belt of claim 1 wherein said elastomeric material of said inner layer of said cover is substantially the same material as said elastomeric material of said belt body.

4. The V-belt of claim 3 wherein said elastomeric material of said inner layer of said cover is substantially the same material as said elastomeric material of said outer layer of said cover.

* * * * *